(12) United States Patent
Senthilnathan et al.

(10) Patent No.: US 8,223,807 B2
(45) Date of Patent: Jul. 17, 2012

(54) SYNCHRONIZING DATA TRANSMISSION OVER WIRELESS NETWORKS

(75) Inventors: Janakiraman Senthilnathan, Nashua, NH (US); Matthew H. Harper, Salem, NH (US)

(73) Assignee: Cisco Technology, Inc., San Jose, CA (US)

( * ) Notice: Subject to any disclaimer, the term of this patent is extended or adjusted under 35 U.S.C. 154(b) by 599 days.

(21) Appl. No.: 12/372,433

(22) Filed: Feb. 17, 2009

(65) Prior Publication Data

US 2009/0207832 A1 Aug. 20, 2009

Related U.S. Application Data

(63) Continuation of application No. 11/218,095, filed on Aug. 31, 2005, now Pat. No. 7,492,770.

(51) Int. Cl.
*H04W 56/00* (2009.01)
(52) U.S. Cl. .......................................... 370/509; 370/519
(58) Field of Classification Search .................. 370/509, 370/519
See application file for complete search history.

(56) References Cited

U.S. PATENT DOCUMENTS

| | | | |
|---|---|---|---|
| 6,895,010 | B1 | 5/2005 | Chang et al. |
| 2003/0086423 | A1 | 5/2003 | Hsu |
| 2003/0165161 | A1 | 9/2003 | Kalliokulju et al. |
| 2004/0085963 | A1 | 5/2004 | Ying |
| 2005/0053069 | A1 | 3/2005 | Lundby |
| 2005/0058090 | A1 | 3/2005 | Chang et al. |
| 2005/0094618 | A1 | 5/2005 | Colban et al. |
| 2006/0222016 | A1* | 10/2006 | Noel et al. ................... 370/503 |
| 2007/0025295 | A1 | 2/2007 | Kono |
| 2007/0140111 | A1 | 6/2007 | Ramanan et al. |
| 2008/0002594 | A1 | 1/2008 | Forsberg et al. |

OTHER PUBLICATIONS

Mills, 'Internet Time Synchronization, The Network Time Protocol', IEEE Transactions on Communications, vol. 39, No. 10, Oct. 1991, pp. 1482-1493.*
International Search Report and Written Opinion issued for International Patent Application No. PCT/US2006/033994.

* cited by examiner

*Primary Examiner* — Melvin Marcelo
(74) *Attorney, Agent, or Firm* — Wilmer Cutler Pickering Hale and Dorr LLP

(57) ABSTRACT

Techniques for providing an uninterrupted data stream to a mobile node are disclosed. In a first technique, a time stamp is inserted at some point in the wireless network and the time stamp is used along with a tolerance value to determine when to transmit a packet in a data stream. By transmitting the packets at the same adjusted time, transmission to mobile nodes is synchronized. A second technique uses duplication of data stream content to avoid an interruption in the data stream at a mobile node. A third technique uses an error correcting code to avoid interruption of the data stream at a mobile node. A fourth technique uses a sequence number inserted into packets in the data stream at the content server to synchronize transmission to mobile nodes.

18 Claims, 8 Drawing Sheets

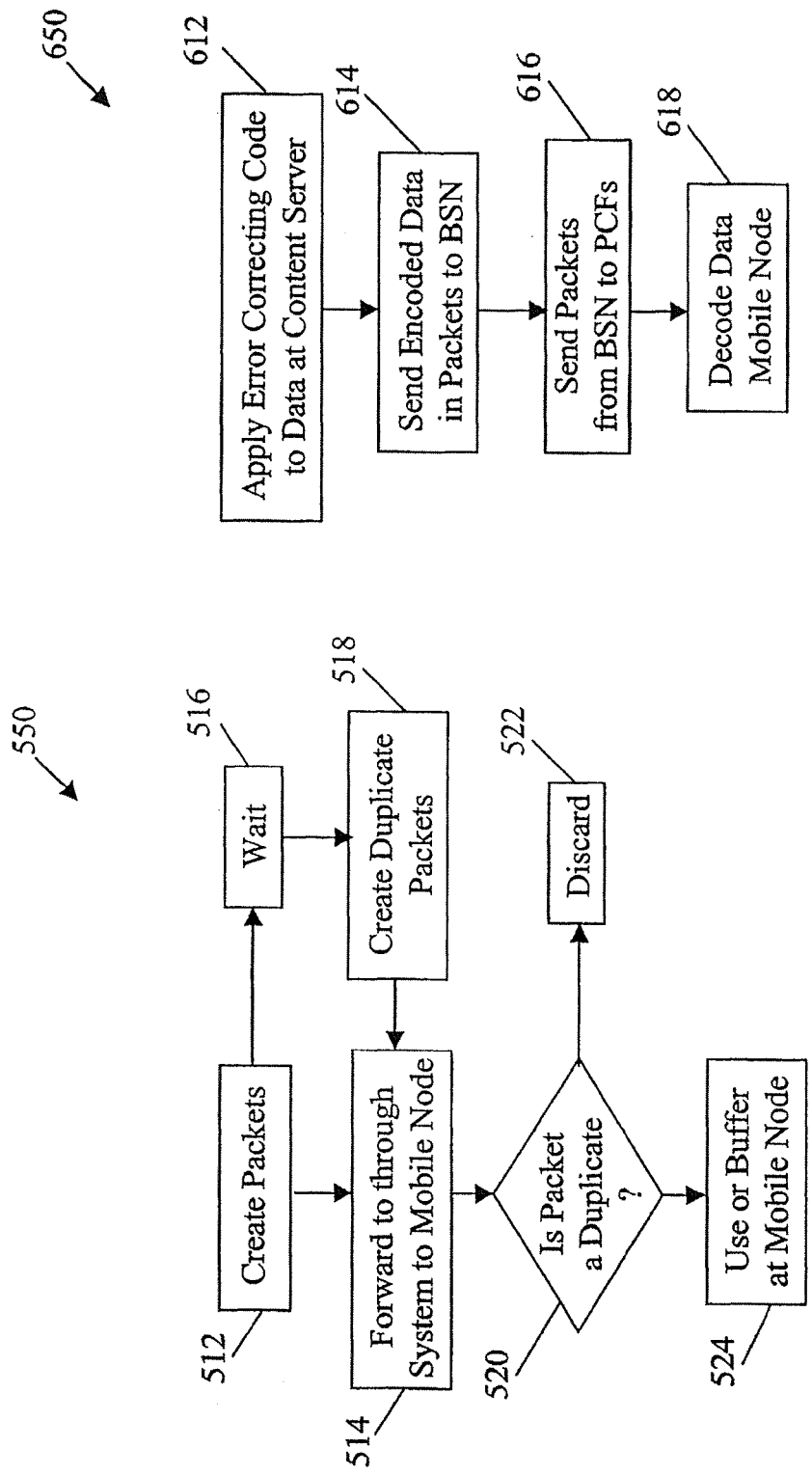

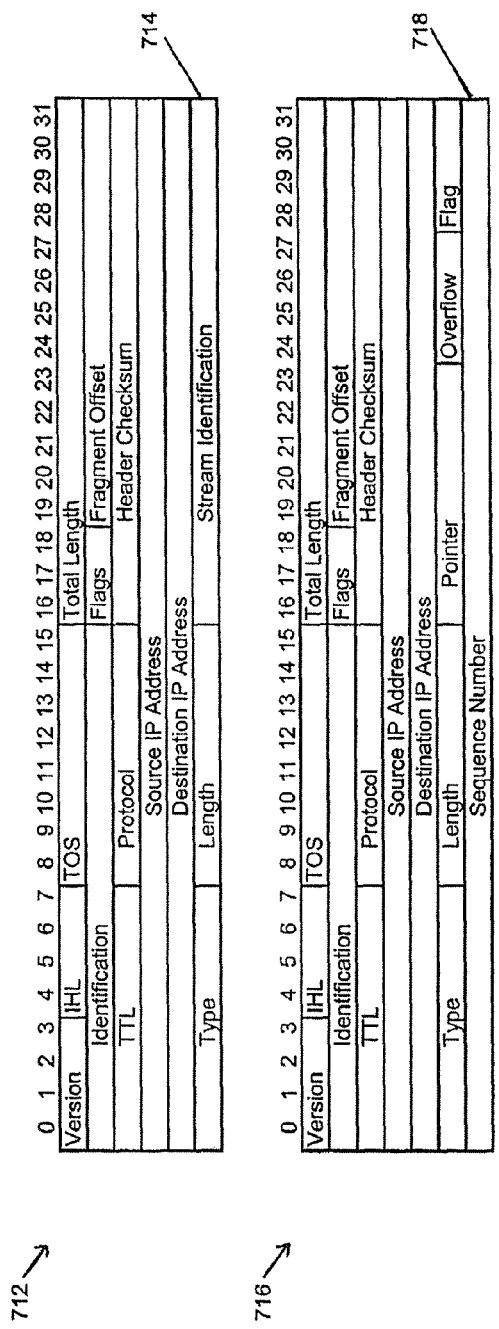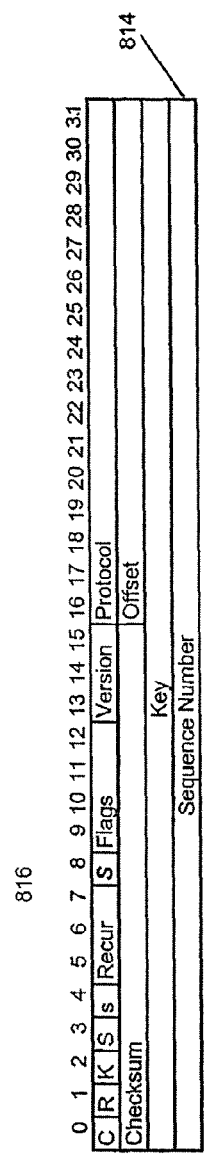
FIG. 7 (PRIOR ART)
FIG. 8

SYNCHRONIZING DATA TRANSMISSION OVER WIRELESS NETWORKS

CROSS REFERENCE TO RELATED APPLICATION

This application is a continuation of U.S. patent application Ser. No. 11/218,095 filed on Aug. 31, 2005, and is hereby incorporated by reference herein in its entirety.

BACKGROUND OF THE INVENTION

The present invention relates to wireless mobile data networks. More particularly, this invention relates to providing an uninterrupted data stream to a mobile node.

Wireless networks are well known in the prior art and have been around for some time. Wireless networks provide users with data without the need for a wired line tethering the user to a certain location. A wireless network is typically composed of a mobile node, base stations and a supporting infrastructure. The mobile node can be, for example, a cell phone, a PDA or a computer with wireless capabilities. These mobile nodes interact with base stations that transmit and receive data. The base stations may further be connected to a network infrastructure that includes other computers and devices.

One of the features possible with a wireless network is the transmission of a data stream to a mobile node. A data stream may be, for example, music, movies, interactive gaming or television shows. Sending the data individually to each user consumes network bandwidth proportional to the number of users requesting the data stream. A broadcast/multicast service provides the ability to transmit the data stream to multiple users without the need to send the data individually to each user. A user of the mobile node may desire to watch or use the data stream even when roaming. However, the user may encounter a problem when the mobile node switches from one base station to another base station. Most likely, for the data stream to continue uninterrupted as the mobile node moves between the two base stations, the base stations need to simultaneously transmit the same information or the data stream needs to be modified in some way. It is, therefore, desirable to permit the user to enjoy an uninterrupted data stream even while roaming.

SUMMARY OF THE INVENTION

In accordance with the present invention, techniques for providing an uninterrupted data stream to a mobile node are presented. In a first technique, a time stamp is inserted at some point in the wireless network and the time stamp is used along with a tolerance value to determine when to transmit a packet in a data stream. By transmitting the packets at the same adjusted time, transmission to mobile nodes is synchronized. A second technique uses duplication of data stream content to avoid an interruption in the data stream at a mobile node. A third technique uses an error correcting code to avoid interruption of the data stream at a mobile node. A fourth technique uses a sequence number inserted into packets in the data stream at the content server to synchronize transmission to mobile nodes.

Thus, in accordance with the present invention, certain embodiments feature synchronizing a clock of a packet control function (PCF) with other PCF clocks on a wireless network, receiving at a PCF a data stream containing a plurality of packets which contain a time stamp, selecting a tolerance value to account for delays on the wireless network and transmitting a packet in the data stream when the tolerance value plus the time stamp equals the current time on the clock of the PCF.

Further in accordance with the present invention, certain embodiments feature forming a data stream of packets at a content server, duplicating packets in the data stream, transmitting the duplicate packets of the data stream after some delay from a packet control function (PCF).

Still further in accordance with the present invention, certain embodiments feature encoding data of the data stream with an error correcting code, transmitting the encoded data to a mobile node and using information from the error correcting code to prevent interruptions in the use of a data stream by a roaming mobile node.

Still further in accordance with the present invention, certain embodiments feature synchronizing a counter of a packet control function (PCF) with other PCF counters on a wireless network, selecting a modulo number to calculate a remainder for each sequence number and transmitting a packet in a data stream when the counter equals the remainder of the sequence number of the packet in the data stream.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which:

FIG. 2 is an illustration of an Internet Protocol (IP) Header with a timestamp;

FIG. 3 is an illustration of a Generic Routing Encapsulation (GRE) Header with a timestamp in accordance with certain embodiments of the present invention;

FIG. 5 is a flow chart describing duplicate packet transmission in accordance with certain embodiments of the present invention;

FIG. 6 is a flow chart describing forward error correction in accordance with certain embodiments of the present invention;

FIG. 7 is an illustration of an IP Header with a sequence number;

FIG. 8 is a flow chart illustrating a sequence numbering synchronization technique in accordance with certain embodiments of the present invention;

DETAILED DESCRIPTION OF THE INVENTION

In accordance with the present invention, systems and methods for managing packet data interconnection in mobile communications are presented. More particularly, a variety of techniques that help to ensure an uninterrupted packet stream to a mobile node (MN) are provided.

Figure 1:
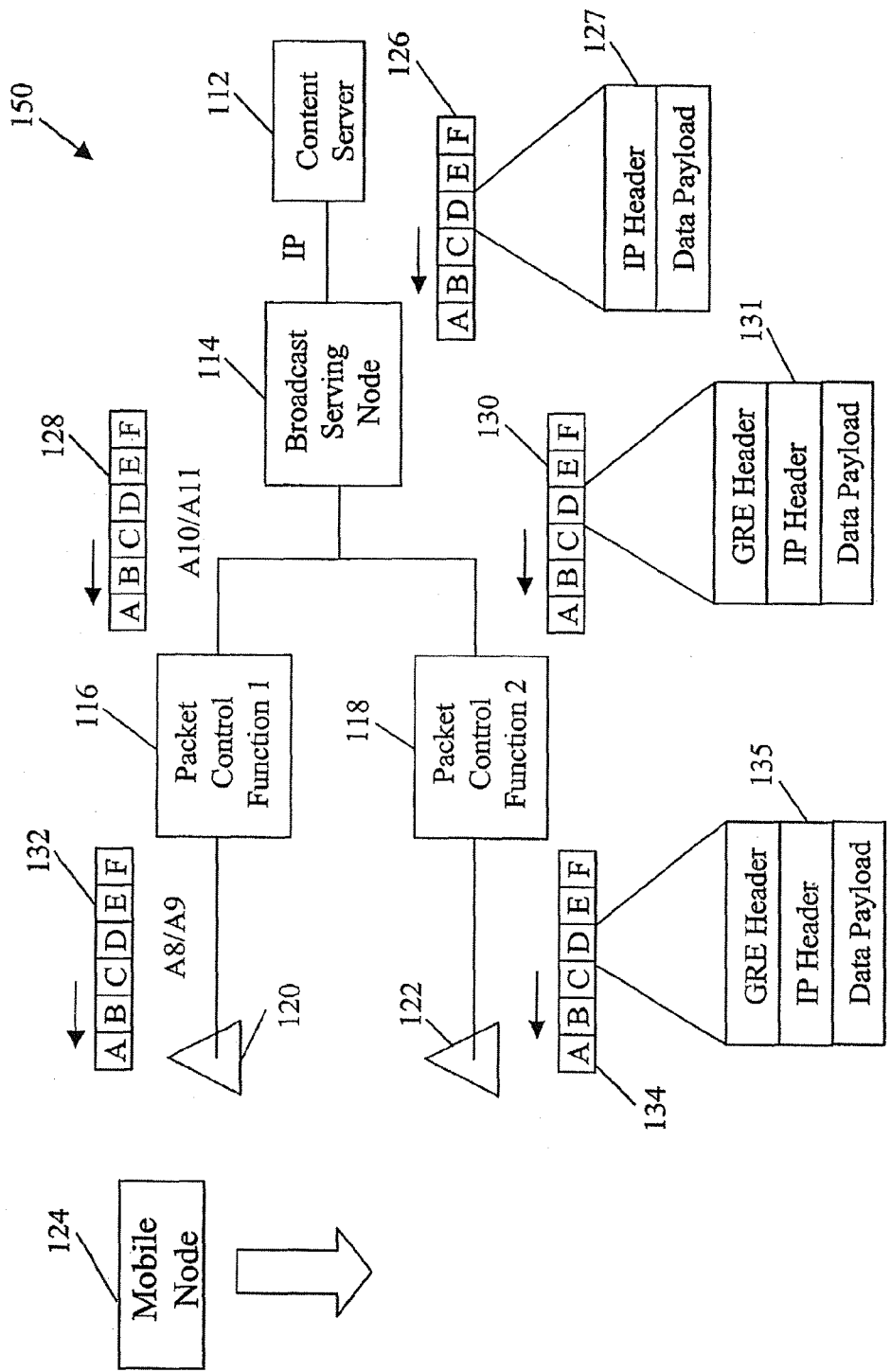
FIG. 1 is a schematic diagram of a wireless network that is capable of transmitting a data stream in accordance with certain embodiments of the present invention.

FIG. 1 illustrates a wireless mobile data network system 150 that serves broadcast/multicast traffic. Illustrated system 150 has a content server 112, a broadcast serving node 114, packet control functions 116 and 118, base stations 120 and 122, and a mobile node 124. Content server 112 provides data, in the form of packets 126, to the network and the requesting user. Packets 126 may be provided in a flow or a stream from content server 112 to broadcast serving node (BSN) 114. A content source packet 127 of packets 126 contains an IP Header and a data payload with the IP Header containing information about how to route the packet across a network or Internet. In some embodiments, packets 126 sent by content server 112 contain a modified header to route information. The modified header may be based on the IP protocol or custom developed for the application.

BSN 114 forwards packets 126 as packets 128 and 130 to packet control functions (PCFs) 116 and 118. The BSN provides the broadcast/multicast functionality on system 150 by adding and removing data streams sent to PCFs. In certain embodiments of the invention, the BSN functionality may be incorporated into another device in a wireless network. The PCFs control processing for the broadcast/multicast data streams and other data services provided to mobile nodes. The PCFs may also be responsible for synchronizing the data transmission to mobile nodes. BSN 114 generally sends packets to PCFs 116 and 118 through A10/A11 interfaces. The A10 interface provides a data transport protocol moving data between BSN 114 and PCFS 116 and 118, while the A11 interface provides control signaling for this data stream. In certain embodiments of the invention, the A11 interface may be used to initiate and terminate a multicast/broadcast flow through the use of a flow id. The flow id may need to be added to A11 protocol and can be used to determine whether the requested data stream is passing through the BSN. If the data stream is already passing through the BSN then the BSN can forward the data stream to the appropriate PCFs without having to request a second data stream.

The number of PCFs to which data is forwarded from the BSN may change depending on the circumstances and how mobile nodes roam across the wireless network. In FIG. 1, PCFs 116 and 118 both receive the data streams because mobile node 124 is roaming from base station 120 to base station 122. PCF 116 and 118 communicate with and control transmission of base stations 120 and 122 respectively. Packets 132 and 134 are sent through A8/A9 interfaces from PCFs 116 and 118 to base stations 120 and 122. Like the A10/A11 interface the A9 interface provides control signaling and the A8 is used for moving data. The A8/A10 interfaces provide a Generic Routing Encapsulation (GRE) Header. The GRE Header is generally placed on top of the IP Header as seen in encapsulated packets 131 and 135.

Base stations 120 and 122 transmit the multicast data wirelessly to mobile node 124. As shown in FIG. 1, mobile node 124 is roaming from base station 120 to base station 122. Such a change may cause problems if the data streams sent by BSN 114 are not sent from the PCFs in a synchronized or otherwise modified manner so the mobile node may recover the data stream without interrupting the functioning of the mobile node. The problems that occur with the data stream arriving at the PCFs may be different depending on the network conditions and the geographical location of the PCFs. For example, network congestion may delay packets 128 and 132 with respect to packets 130 and 134. The result can be that base station 122 transmits packets ahead of base station 120. Therefore, when mobile node 124 roams from base station 120 to 122 packets of data are lost in the transition. Lost packets may result in a degradation of the service being provided to the user and may case an interruption in the data stream at the mobile node. Another case where the data stream may be interrupted is when the packets received by the mobile node from base station 122 station lag the packets of base station 120 in transmission to mobile node 124. In this case, mobile node 124 may have to wait for the packets to catch up to the point where the last base station was transmitting. The delay time may cause an interruption to the use of the data stream depending on the buffering present in the mobile node and amount of delay between the two base stations.

Figures 2, 3:
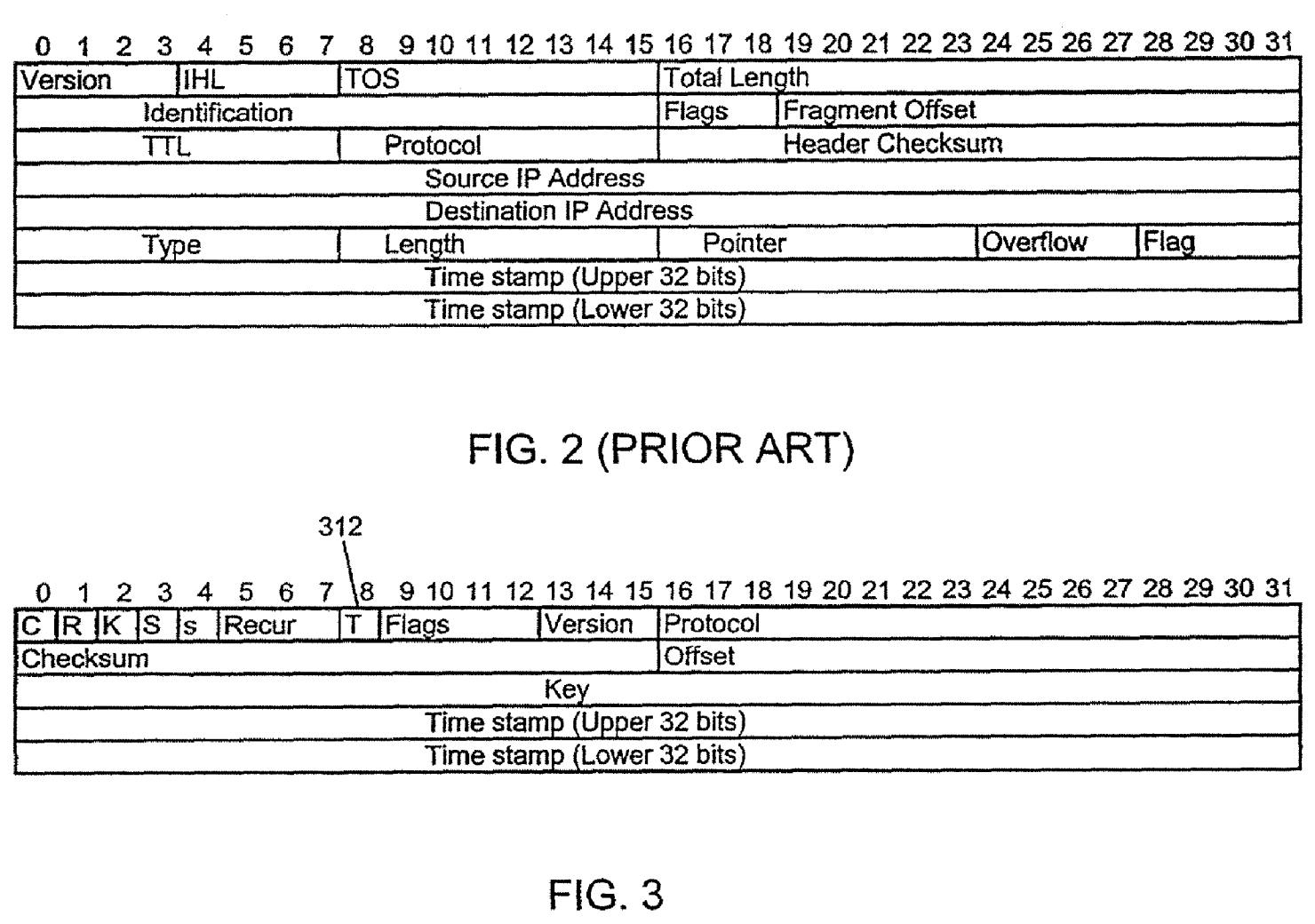

In one technique to solve the above-mentioned problem, time stamping is used to synchronize the transmissions from the base stations to the mobile node. FIG. 2 shows a standard IP Header with options enabled and a 64-bit time stamp inserted as the standard allows. The standard IP Header allows for the insertion of up to 64 bits of time stamp information. In certain embodiments of the invention, the upper 32 bits may be the time in seconds and the lower 32 bits may be the fractions of a second. If the equipment being used in the wireless network accepts a 32-bit time stamp, then the lower 32 bits can be number representing the position in the second the packet was transmitted. The modification may be implemented by using a counter that resets every second to assign a number to each packet. The PCFs can later use the number to order the packets that arrive within the span of a second.

The time stamping technique is implemented on system 150 in certain embodiments of the present invention. The wireless system with time stamping enabled can have content server 112, BSN 114, PCFs 116 and 118, base stations 120 and 122, and mobile node 124. In some embodiments, the internal clocks of content server 112 and the PCFs 116 and 118 are synchronized using a time synchronization protocol such as the network time protocol (NTP) or by any other time synchronization technique. In other embodiments, such as when the time stamp is inserted by the BSNs, the clocks of the BSNs and PCFs may be synchronized. In certain embodiments, content server packet 127 is modified to include a time stamp. The time stamp may be inserted in the IP Header as shown in FIG. 2, inserted in a custom header, inserted by encoding the time stamp in multiple fields of the header or inserted in the data payload. Upon reaching BSN 114, the time stamp may be encapsulated with the rest of the packet by a GRE header, copied and placed into the GRE header or handled in any other fashion in accordance with the present invention.

FIG. 3 illustrates a GRE header modified to include time stamp information in accordance with some embodiments of the present invention. A time stamp bit (T) 312 is inserted in bit 8 of the header to indicate 64 bits of time stamp information is included in the header. The 64-bit timestamp is composed of an upper and lower section. The upper 32 bits indicate the time in seconds and the lower 32 bits indicate the fractions of a second. The 64-bit time stamp is used to determine when to transmit the packet. A tolerance value is a number relating to a time stamp that indicates when to send a packet at the PCF. In certain embodiments, the tolerance value is the maximum expected delay to reach any one of the PCFs in the network. The tolerance value may be the same for all PCFs in the system. The PCF determines when to send a packet by adding the tolerance value to the time stamp and then checking the summed value against the PCF's synchronized clock. In certain embodiments, the tolerance value may be chosen at the BSN or the content server and sent to the PCF in the header of a packet, in a packet payload, in an initialization packet at the start of a connection or by any other manner. The tolerance value may be retrieved from a lookup table, defined by an algorithm analyzing the network, set by an administrator or obtained by any other manner. In still other embodiments, the tolerance value may be recalculated whenever a packet is discarded by one of PCFs because the packet arrived late.

Figure 4:
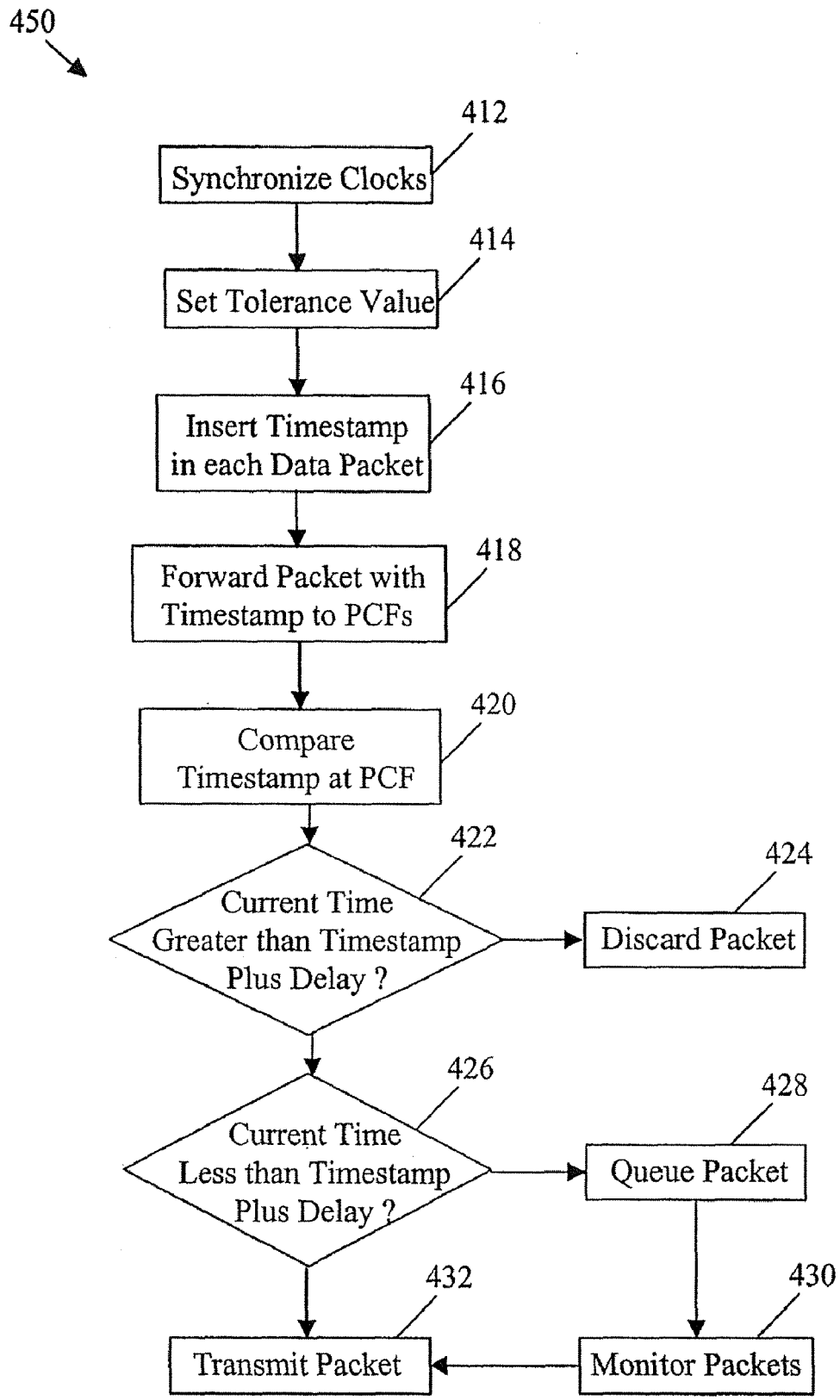
FIG. 4 is flow chart illustrating a timestamp synchronization technique in accordance with certain embodiments of the present invention.

FIG. 4 illustrates a process 450 for synchronizing packet transmission with time stamping. As shown, process 450 begins with step 412 where, in certain embodiments of the present invention, the internal clocks of the PCFs are synchronized using a time synchronization protocol such as network time protocol (NTP). In other embodiments of the present invention, at step 412 the clocks of the BSNs along with the PCFs are synchronized or the clocks of the content server along with the PCFs are synchronized. Then at step 414 the tolerance value is set. Next, in step 416, in some embodiments of the invention, the content server inserts a time stamp in each data packet that it transmits over to the BSNs. In other embodiments, at step 416, the BSNs insert a time stamp in each data packet forwarded to the PCFs. Then at step 418, the packet with the time stamp is forwarded from the BSN to the PCF. At step 420, the time stamp in the data packet is inspected by the PCF and compared against the PCF's synchronized clock. If the current time is greater than the packet timestamp plus the tolerance value, at step 422, the packet is discarded at step 424. If the current time is less than the time stamp plus the tolerance value at step 426, the packet is queued at step 428. The PCFs may include a buffer for queuing packets that arrive before the current time equals the tolerance value plus the time stamp. The queued packets at step 428 are monitored at step 430 by the PCF continuously to identify when the packets should be transmitted. The queuing of the packets until the timestamp plus a tolerance value is equal to the current time allows the various PCFs to transmit the packets at the same time. In some embodiments, the timestamp inserted into the data packet may already include the tolerance value so the timestamp of the data packet need only be checked against current time. If the packets are indicated as being ready for transmission at either step 426 or 430 then the packets are transmitted at step 432.

In another technique to solve the above-mentioned problem, duplicate transmission at either the content server, the BSNs or the PCFs in a wireless network is used to prevent interruptions in a data stream. The duplication of packets at the BSN may be desirable to reduce the network bandwidth needed between the content server and the BSN when compared with a duplication method at the content server. The duplication of packets at the PCF requires the least amount of additional bandwidth on the network out of the three duplication methods described. The technique may rely on a mobile node processing procedure to recognize and discard duplicate packets in a mobile node's jitter buffer. A jitter buffer is typically used to eliminate any fluctuations in the incoming data that may be due to any number of network conditions, for example, congestion of the packets or transmission along varyingly delayed paths on the network. The wireless system implementing a duplicate transmission technique may have content server 112, a BSN 114, PCFs 116 and 118, base stations 120 and 122 and mobile node 124.

The result of the packet duplication at either content server 112, BSN 114 or PCFs 116 and 118 is that mobile node 124 may receive two or more copies of each packet when stationary. In certain embodiments of the present invention, software present in mobile node 124 for playing back the multicast stream may automatically discard any duplicate packets received. When mobile node 124 is moving from base station 120 to base station 122, several possible situations may arise regarding how many duplicate packets the mobile node receives.

In one case, PCF 118 transmits the data stream ahead of PCF 116, when mobile node 124 is moving within transmitting range of PCF 118 and out of the range of PCF 116. Mobile node 124 may thus lose some data packets that were transmitted earlier by PCF 118 (but not yet by PCF 116). Software in the mobile node then buffers whatever packets arrive from PCF 118 and wait for the missing packets. Typically, the software that processes real-time multimedia streams maintains the jitter buffer which allows the mobile node to receive data packets delayed by varying amounts of time. Thus, when PCF 118 transmits the duplicate packets after a slight delay, the mobile node may receive the packets that were originally regarded as missing. The software in the mobile node, upon receipt of the delayed packets may be able to process the whole stream correctly.

In another case, PCF 118 transmits the data stream behind PCF 116 as mobile node 124 moves from PCF 116 to PCF 118. The mobile node may receive the same data packet multiple times between the two PCFs depending on circumstances. The software in the mobile node may be able to discard the duplicate packets and effectively reconstruct the original data stream without losing any packets.

In yet another case, PCFs 116 and 118 may transmit synchronously when mobile node 124 is moving from one to the other. The mobile node may receive the same data packet more than one time between the two PCFs depending on the circumstances in this case. The software in the mobile node may be able to discard the duplicate packets and reconstruct the original data stream without losing any packets.

FIG. 5 illustrates a process 550 for duplicating packets to provide a data stream. The process begins at step 512 where the packets are formed from data stored on the content server. Next at step 514, the packets are forwarded through the network to the mobile node. Then after some delay at step 516, duplicate packets are created at step 518. The duplicate packets may be created at the content server, the BSNs, the PCFs or in any other device in transmission path of the data stream in accordance with the present invention. In other embodiments, the packets may be copied and buffered to delay the duplicated packets before transmission. The buffer may be implemented as a simple first-in first out (FIFO) queue in one of the devices in system 150. The duplicate packets created in step 518 are forwarded to the mobile node in step 514. At step 520, the packet is checked at the mobile node to determine if it is a duplicate. If the packet is found to be a duplicate, then the packet is discarded in step 522. If the packet is the first or only instance of the packet then the packet may be buffered or used immediately by the mobile node depending on the circumstances.

In yet another technique, an error correcting code is applied at the content server before the transmission of a packet. An error correcting code may be any modification to the original data that makes the data more robust against possible corruption. Typically, an error correcting code adds redundancy to the original data so that missing or incorrect data may be fixed, depending on the severity of the error, without the need for retransmission. In the case of the roaming mobile node, the error correcting code serves to correct errors associated with unsynchronized transmissions from PCFs. The error correcting code may provide sufficient information at the decoding stage to reconstruct the missing data in the data stream. The error correcting code may be a forward error correction (FEC) encoding technique on the data stream before the transmission, a direct sequence spread spectrum technique, a Hamming error correcting code or any other applicable error correction encoding technique in accordance with the present invention. The use of error correcting codes may reduce errors associated with transmission timing and mobile node roaming across PCFs.

In other embodiments, the error correcting code, such as forward error correction, may be applied at the BSN to the data stream instead of at the content server before forwarding to the PCFs. In still other embodiments, the error correction code may be applied at the PCF instead of at the content server or BSN before forwarding to the mobile node. In certain embodiments, the error correcting code may be applied to the data and header that is encapsulated by the GRE header. In other embodiments, a custom header is used with the encoded data when transmitting the data through the network to the mobile node.

FIG. 6 illustrates process 650 where an error correcting code is applied on a wireless network to prevent data stream interruptions in accordance with the present invention. The illustrated process begins at step 612 where the original data is encoded according to an error correction code. The encoding may occur at the content server (as illustrated), or at the BSNs, the PCFs or any other device along the transmission path in accordance with the present invention. After the data is encoded at step 612, the data is forwarded through the network to the mobile node, here illustrated as steps 614 and 616. Then at step 618, the mobile node attempts to recover the original data by decoding the packets.

In still another technique, a sequence number is used to synchronize data transmission as shown in wireless network system 150. The wireless network system may have content server 112, BSN 114, PCFs 116 and 118, base stations 120 and 122 and mobile node 124. In certain embodiments, content server 112 may embed a sequence number within the data payload of the packet. In other embodiments, an identification number included in the packet header or any other identifying aspect of the packet may be used as a sequence number in accordance with the present invention. FIG. 7 illustrates a standard IP Header with options enabled 712 and a 16-bit stream id 714 inserted in accordance with the present invention. In certain embodiments of the invention, the stream id may be the sequence number of the packet. In some embodiments, a longer sequence number, such as a 32-bit sequence number, may be inserted in a standard IP Header 716 by enabling the time stamp option in the standard IP Header. While enabling the use of time stamp field is known in the art, in certain embodiments of the invention, a sequence number 718 is used rather than time stamp. In other embodiments of the present invention, the GRE header 812 is modified to handle a sequence number 814 as shown in FIG. 8. A sequence number bit (S) 816 is added at bit 8 of the header. In other embodiments, the sequence number bit may be placed elsewhere in the GRE header. In still other embodiments, the sequence number in the GRE header may be up to 32 bits long.

In certain embodiments of the present invention, PCFs 116 and 118 are configured with a time delay value that corresponds to the size of a jitter buffer required to overcome the maximum anticipated delay between content server 112 and the PCFs in the network. The jitter buffer may also be used to eliminate packet rate fluctuations (i.e., the number of packets arriving at a time). Packet rate fluctuations can be caused by such network factors as, for example, varying congestion on different paths traveled by the packets of the data stream.

Figure 9:
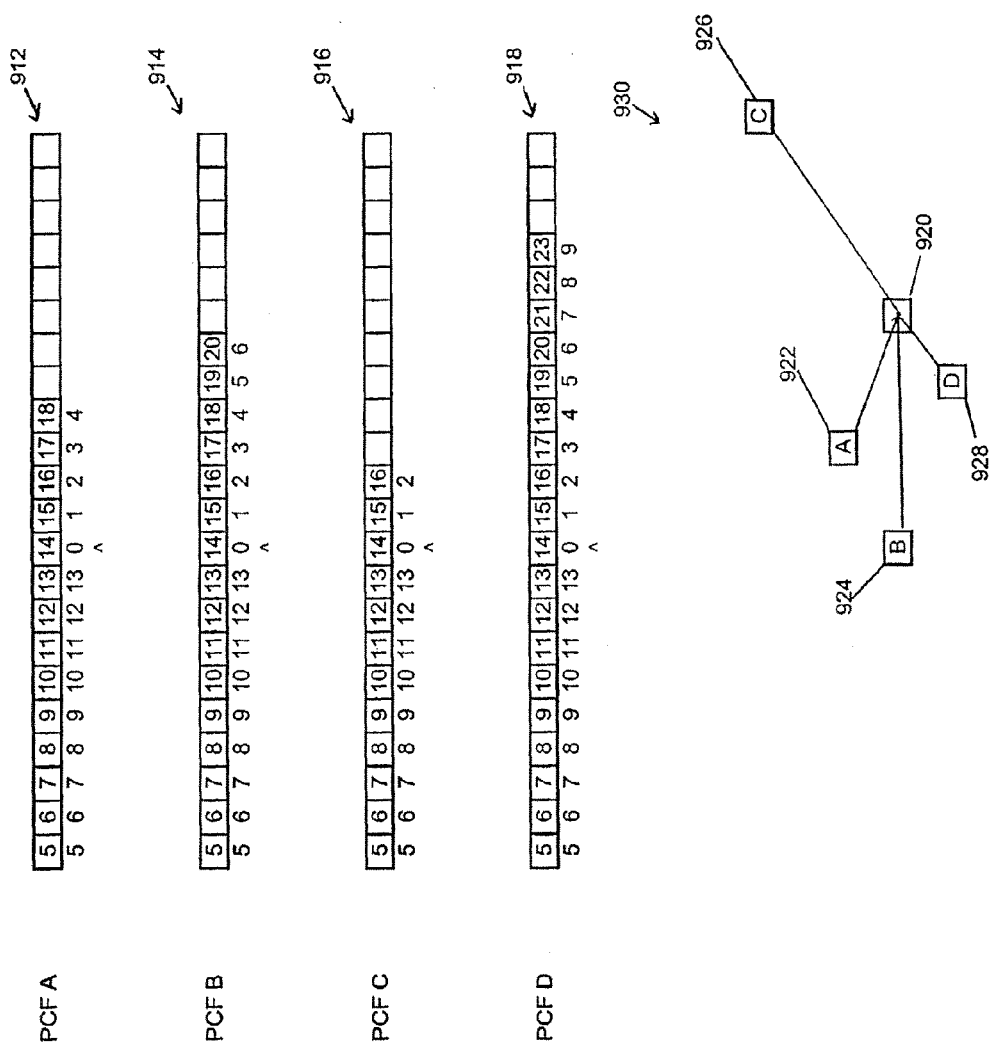
FIG. 9 is an illustration showing how sequence numbers are used to synchronize transmission in accordance with certain embodiments of the present invention.

Referring to FIG. 9, in certain embodiments, the packets are assigned sequence numbers, and the remainder after calculating the value of the sequence number modulo a selected "modulo number," is used to control the order and time of packet transmission. The modulo number is selected based the size of the jitter buffer. In other embodiments, the modulo number is chosen based on the size of the jitter buffer and the rate of packets entering the jitter buffer. The modulo number may be chosen so that the packets contained within the jitter buffer have unique remainders after the modulo operation is completed. In some embodiments, the modulo numbers may be selected using a lookup table in each PCF. In other embodiments, the modulo number may be static, sent by the content server to the PCFs or chosen by the PCFs based on an algorithm.

FIG. 9 illustrates how modulo numbers are used to synchronize packet transmission among four geographically dispersed locations (A, B, C and D) in the network in accordance with certain embodiments of the present invention. As shown in FIG. 9, PCF A jitter buffer 912, PCF B jitter buffer 914, PCF C jitter buffer 916 and PCF D jitter buffer 918 have varying numbers of packets in their respective jitter buffers as a result of varying delays on the network. A simplified system 930 illustrates a content server 920, PCF A 922, PCF B 924, PCF C 926 and PCF D 928 where each of the PCFs are located a varying distance from content server 920.

In the FIG. 9 example, a modulo number of fourteen was chosen for ease of explaining how sequence numbering synchronization works. The remainder of a sequence number following a modulo operation is shown below each of the illustrated jitter buffers in FIG. 9 (for example in PCF A jitter buffer 912 there are sequence number packets 5-18). To synchronize transmission of the data packets, the PCFs choose the packet with the same remainder at the same moment of time. The PCFs may choose the same packet by utilizing a counter based on the synchronized clocks contained within each PCF. In certain embodiments, the packet that has a remainder equal to the current value of the counter is transmitted by the PCF. If a number of PCFs in the network have synchronized clocks and the counters use the clocks to start and increment, then the counters may also be synchronized. In other embodiments, the values of the synchronized clock may be directly manipulated to perform the functionality of a counter. In the example of FIG. 9, the value of the counter is 0 and an arrowhead indicates the packet selected for transmission. Therefore, the packet with sequence number 14 is transmitted by the PCFs at the same time. When the counter increments to 1, packet 15 is transmitted.

Figure 10:
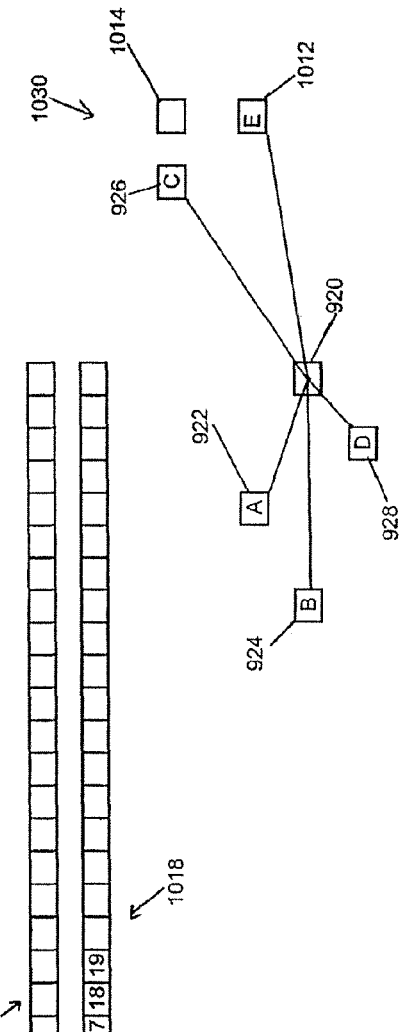
FIG. 10 is an illustration showing how sequence numbers are used to synchronize transmission when a mobile node is roaming in accordance with certain embodiments of the present invention.

FIG. 10 illustrates how a new PCF may begin transmitting synchronized data to a roaming mobile node in accordance with certain embodiments of the present invention. A simplified system 1030 with a roaming node 1014 has a content server 920, PCF A 922, PCF B 924, PCF C 926, PCF D 928, PCF E 1012 and a mobile node 1014. FIG. 10 additionally illustrates two jitter buffers for each PCF, namely PCFs A through E, and a modulo of 14 is used throughout the buffers. Each set of jitter buffers at a PCF are the same jitter buffer, but illustrated at different points in time. In FIG. 10, the upper jitter buffer is illustrative of a counter time equal to 0 (C=0) and the lower buffer is illustrative of a counter time equal to 2 (C=2). Thus, FIG. 10 is meant to show how certain embodiments of the present invention may behave with the elapse of time. In operation, assume that mobile node 1014 is roaming away from the area covered by PCF C 926 and into the area covered by PCF E 1012. Content server 920 may begin sending packets to PCF E 1012 once it has been detected that mobile node 1014 is roaming into the coverage area of PCF E 1012. In the FIG. 10 example, when the counter (C) is equal to 0, PCF E has received packet 16 in jitter buffer 1016. When the counter reaches a value of 2, PCF E jitter buffer 1018 has packets 16 through 19 and PCF E transmits packet 16 along with the other PCFs. Illustrated PCF C 926 and PCF E 1012 transmit subsequent packets at the same time as the counter increments so mobile node 1014 can roam into the coverage area of PCF E without any interruption in the data stream.

Figure 11:
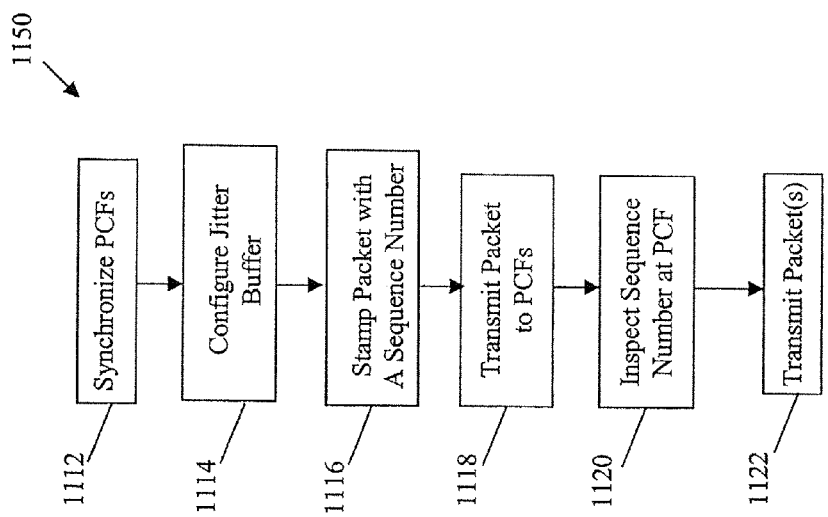
FIG. 11 is a flow chart describing how to synchronize transmission by using sequence numbers in accordance with certain embodiments of the present invention.

FIG. 11 illustrates a process 1150 for synchronizing transmission using sequence numbers in accordance with certain embodiments of the present invention. Process 1150 begins at step 1112 where the internal clocks of the PCFs are synchronized using a time synchronization protocol such as NTP. The synchronization along with the sequence numbers allows the PCFs to perform synchronized transmissions. The counters begin incrementing upon the synchronization of the clocks so that the counters are also synchronized in the value of the count. In certain embodiments, the counters may be software based and rely on information from the synchronized clocks in the PCFs to operate. Next, in step 1114, the jitter buffer is configured in the PCFs to overcome the maximum anticipated delay a packet might experience traveling from content server 1112 to any PCF. In certain embodiments, the PCF may maintain a separate jitter buffer sorted by a packet sequence number for each data stream being transmitted to the mobile node. In some embodiments, the modulo number may be selected after the arrival rate of the packets in the data stream and is then either calculated for the first time or is otherwise known. Once step 1114 is complete, content server 112, in certain embodiments, embeds within the data payload or places in the IP header a sequence number, step 1116. The packets are then transmitted to the PCFs in step 1118. When the packets reach the PCF, the sequence number of the packet is inspected in step 1120. From the inspection, the PCF may be able to determine the expected packet rate per second and the corresponding inter-packet transmission interval. In other embodiments, the expected value for some known transmissions may be statically set or the content server may send the rate to the PCF. In still other embodiments, the packet arrival rate for a stream may be negotiated by the PCFs. Then at step 1122, the packet with a remainder equal to the value of the counter is transmitted to the mobile node. In some embodiments, a group of packets is transmitted with each increment of the counter.

In certain embodiments, the PCFs with synchronized time may use the following procedure to select the same packet and to transmit the packet simultaneously from each PCF. Within each PCF, a jitter buffer holding packets for a delay (Td) may contain packets with sequence numbers: S, S+1, S+2, S+3, ..., S+n. If the jitter buffer receives N packets/sec every Td seconds and the PCF has a counter that counts 1 ... C every Td seconds, then each PCF begins transmitting a packet which is a multiple of sequence number S when S modulo N=C. The procedure ensures N packets are transmitted every (Td) period so the buffer is not overrun by transmitting a packet with every increment of the counter.

Other embodiments, extensions, and modifications of the embodiments presented above are within the understanding of one versed in the art upon reviewing the present disclosure. Accordingly, the scope of the present invention in its various aspects should not be limited by the examples presented above. The individual aspects of the present invention, and the entirety of the invention should be regarded so as to allow for design modifications and future developments within the scope of the present disclosure.

We claim:

1. A method of transmitting to a plurality of mobile nodes comprising:
    synchronizing a clock of a packet control function (PCF) with a clock available on a wireless network;
    receiving at the PCF a tolerance value to account for transmission delays on the wireless network and to synchronize transmission between a plurality of PCFs in the wireless network;
    receiving at the PCF a data stream with a plurality of packets which contain a time stamp; and
    transmitting a packet in the data stream when the tolerance value plus the time stamp equals the current time on the clock of the PCF, wherein the transmission of the packet from the PCF is synchronized with the transmission of the same packet at a second PCF.

2. The method of claim 1, further comprising inserting a time stamp into a packet of the data stream at a content server.

3. The method of claim 1, further comprising:
    synchronizing the clock of a broadcast serving node (BSN); and
    inserting a time stamp into a packet of the data stream at a BSN.

4. The method of claim 1, wherein the synchronizing is performed using network time protocol.

5. The method of claim 1, wherein the time stamp is a 64-bit time stamp with the upper 32 bits indicating time in seconds and the lower 32 bits indicating fractions of a second.

6. The method of claim 1, further comprising receiving the tolerance value at the PCF at a start of a connection.

7. The method of claim 1, further comprising receiving at the PCF the tolerance value that is defined by an algorithm analyzing the wireless network to synchronize transmission of the data stream.

8. The method of claim 1, further comprising discarding the packet if current time on the clock of the PCF is greater than the timestamp plus the tolerance value.

9. A system for transmitting to a plurality of mobile nodes comprising:
    means for receiving a data stream containing a plurality of packets which contain a time stamp and for receiving a tolerance value to account for transmission delays on the wireless network and to synchronize transmission to a plurality of base stations in the wireless network;
    means for synchronizing a clock of the means for receiving with another clock on a wireless network; and
    means for transmitting to a base station a packet in the data stream when the tolerance value plus the time stamp equals the current time on the clock of the means for receiving.

10. The system of claim 9, further comprising means for inserting a time stamp into a packet of the data stream at a content server.

11. The system of claim 9, wherein the time stamp is a 64-bit time stamp with the upper 32 bits indicating time in seconds and the lower 32 bits indicating fractions of a second.

12. The system of claim 9, wherein the tolerance value is received by the means for transmitting to the base station at a start of a connection.

13. The system of claim 9, wherein the tolerance value is defined by an algorithm analyzing the wireless network.

14. The system of claim 9, wherein the means for transmitting discards the packet if current time on the clock is greater than the timestamp plus the tolerance value.

15. Logic encoded on a non-transitory computer readable medium that when executed configured to:
  synchronize a clock with a clock available on a wireless network;
  receive a tolerance value to account for transmission delays on the wireless network and to synchronize transmission to a plurality of mobile nodes in the wireless network;
  receive a data stream with a plurality of packets which contain a time stamp; and
  transmit a packet in the data stream when the tolerance value plus the time stamp equals the current time on the clock, wherein the transmission of the packet to a first plurality of mobile nodes is synchronized with the transmission of the same packet elsewhere in the wireless network to a second plurality of mobile nodes.

16. The logic of claim 15, further comprising receiving the tolerance value at a start of a connection.

17. The logic of claim 15, further comprising receiving the tolerance value that is defined by an algorithm analyzing the wireless network to synchronize transmission of the data stream.

18. The logic of claim 15, further comprising discarding the packet if current time on the clock is greater than the timestamp plus the tolerance value.

\* \* \* \* \*